(12) United States Patent
White, Jr. et al.

(10) Patent No.: US 8,769,091 B2
(45) Date of Patent: *Jul. 1, 2014

(54) METHOD, DEVICE AND MEDIUM FOR DETERMINING OPERATIONS PERFORMED ON A PACKET

(75) Inventors: David C. White, Jr., Durham, NC (US); Iqlas Maheen Ottamalika, San Jose, CA (US); Madhusudan Challa, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/397,213

(22) Filed: Feb. 15, 2012

(65) Prior Publication Data

US 2012/0166637 A1 Jun. 28, 2012

Related U.S. Application Data

(63) Continuation-in-part of application No. 13/234,091, filed on Sep. 15, 2011, now Pat. No. 8,510,436, which is a continuation of application No. 11/441,566, filed on May 25, 2006, now Pat. No. 8,041,804.

(51) Int. Cl.
*G06F 15/173* (2006.01)

(52) U.S. Cl.
USPC .......................................... 709/224

(58) Field of Classification Search
CPC ..... H04L 29/00; H04L 63/1425; H04L 63/20; H04L 63/02
USPC .......... 709/223–226, 238, 221; 370/236, 255, 370/392

See application file for complete search history.

(56) References Cited

U.S. PATENT DOCUMENTS

| | | | |
|---|---|---|---|
| 5,640,394 | A | 6/1997 | Schrier |
| 5,696,899 | A | 12/1997 | Kalwitz |
| 5,819,042 | A | 10/1998 | Hansen |
| 5,850,388 | A | 12/1998 | Anderson |
| 6,137,782 | A | 10/2000 | Sharon |
| 6,515,967 | B1 | 2/2003 | Wei |
| 6,539,022 | B1 | 3/2003 | Virgile |
| 7,738,403 | B2 | 6/2010 | Ottamalika |
| 7,810,041 | B2 | 10/2010 | Rao |
| 2002/0038379 | A1 | 3/2002 | Sato |
| 2002/0071387 | A1 | 6/2002 | Horiguchi |
| 2003/0005145 | A1 | 1/2003 | Bullard |

(Continued)

OTHER PUBLICATIONS

USPTO; Office Action for U.S. Appl. No. 11/441,566; mailed Feb. 4, 2009.

(Continued)

*Primary Examiner* — Thai Nguyen

(57) ABSTRACT

A system for tracing operations executed by a network device on a packet wherein a network device may capture a packet and determine whether the packet is a candidate for tracing; if the packet is a candidate for tracing the network device may set a trace option identifier within the packet indicating that the packet is to be tagged in association with operations performed on or in association with the packet by the network device. The network device may tag the packet with one or more tags in response to the trace option identifier, export the packet with the trace option identifier, generate a report based on the tags and send the report to a network management station.

20 Claims, 10 Drawing Sheets

(56) References Cited

U.S. PATENT DOCUMENTS

| | | |
|---|---|---|
| 2003/0091042 A1 | 5/2003 | Lor |
| 2003/0187977 A1 | 10/2003 | Cranor |
| 2003/0236995 A1 | 12/2003 | Fretwell, Jr. |
| 2004/0047349 A1 | 3/2004 | Fujita |
| 2004/0093521 A1* | 5/2004 | Hamadeh et al. ............. 713/201 |
| 2004/0103315 A1 | 5/2004 | Cooper |
| 2004/0114590 A1 | 6/2004 | Harris |
| 2005/0099948 A1 | 5/2005 | Wakumoto |
| 2005/0169186 A1 | 8/2005 | Qiu |
| 2005/0190758 A1 | 9/2005 | Gai |
| 2005/0259587 A1 | 11/2005 | Wakumoto |
| 2006/0023638 A1 | 2/2006 | Monaco |
| 2006/0077964 A1 | 4/2006 | Wu |
| 2007/0002769 A1 | 1/2007 | Matituahu |

OTHER PUBLICATIONS

Stolowitz Ford Cowger LLP, Listing of Related Cases, Mar. 19, 2012.

* cited by examiner

METHOD, DEVICE AND MEDIUM FOR DETERMINING OPERATIONS PERFORMED ON A PACKET

RELATED APPLICATIONS

This application is a continuation-in-part of U.S. patent application Ser. No. 13/234,091 filed Sep. 15, 2011, which is a continuation of U.S. Pat. No. 8,041,804, filed May 25, 2006, which are both incorporated by reference in their entirety. The U.S. Pat. No. 7,738,403, filed Jan. 23, 2006, entitled "A METHOD FOR DETERMINING THE OPERATIONS PERFORMED ON PACKETS BY A NETWORK DEVICE," by Iqlas Ottamalika, David C. White, Jr., and Madhu Challa, assigned to the same assignee of the present Patent Application, is hereby incorporated by reference in its entirety.

TECHNICAL FIELD

This disclosure generally relates to tagging IP packets to determine the operations performed on packets by a network device.

BACKGROUND

A packet en route to its destination often passes through one or more networking device(s). For example, for security purposes, a packet may pass through a firewall, a router, or an Intrusion Prevention System (IPS). Once a networking device has received the packet it may perform a series of operations and actions on the packet before determining whether the packet should be allowed to be transmitted or dropped. In the event of a network problem troubleshooting may involve determining what actions or operations were performed on a particular packet and which network devices performed those actions or operations. Conventional approaches to making this determination involve examining associated logs (syslogs) and debugs and manually correlating packets to the operations and/or actions and the network devices that performed the operations and/or actions.

DESCRIPTION OF EXAMPLE EMBODIMENTS

Overview

Figure 1:
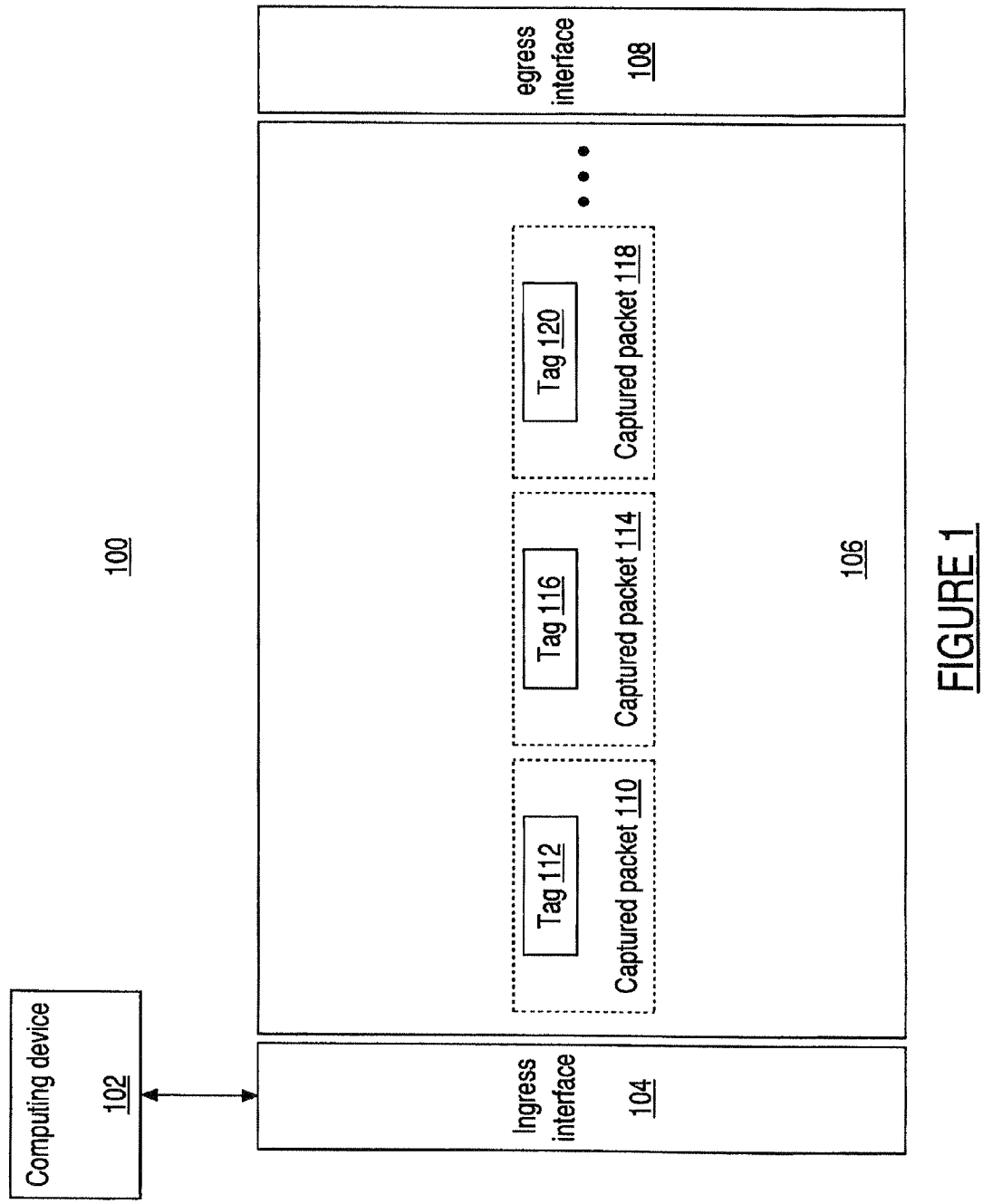
FIG. 1 illustrates an example embodiment of a system for utilizing captured packets.

In a system for tracing operations executed by a network device on a packet a network device may capture a packet, determine whether the packet is a candidate for tracing. If the packet is a candidate for tracing the network device may set a trace option identifier within the packet indicating that the packet is to be tagged in association with operations performed on or in association with the packet by the network device. The network device may then tag the packet with one or more tags based on the trace option identifier and generate a report based on the tags.

Several examples of the present application will now be described with reference to the accompanying drawings. Various other examples of the disclosed technology are also possible and practical. This application may be exemplified in many different forms and should not be construed as being limited to the examples set forth herein. The figures listed above illustrate various examples of the application and the operation of such examples. In the figures, the size of the boxes is not intended to represent the size of the various physical components. Only those parts of the various units are shown and described which are necessary to convey an understanding of the examples to those skilled in the art.

Additional aspects and advantages will be apparent from the following detailed description of example embodiments. The illustrated example embodiments and features are offered by way of example and not limitation. Furthermore, the described features, structures, or characteristics may be combined in any suitable manner in one or more example embodiments.

In general, the methodologies of the present disclosed technology may be carried out using one or more digital processors, for example the types of microprocessors that are commonly found in PC's, servers, laptops, Personal Data Assistants (PDAs) and all manner of desktop or portable electronic appliances.

In the following description, certain specific details of programming, software modules, user selections, network transactions, database queries, database structures, etc., are provided for a thorough understanding of the example embodiments of the disclosed technology. However, those skilled in the art will recognize that the disclosed technology can be practiced without one or more of the specific details, or with other methods, components, materials, etc.

Under traditional approaches, it is often difficult to determine the operations taken on a packet. For example, scrutinizing logs (syslog) to validate if a network device is denying traffic that is denied in its corresponding configuration and permitting traffic that is permitted in the corresponding configuration is often time consuming and inefficient. Thus, an efficient way to determine the operations taken on a packet is desired.

One approach utilizes a simulated packet to determine operations taken on a packet. In one example, a simulated packet is input into a network device and the path taken by the simulated packet is recorded by adding tags to the simulated packet. Similarly, the operations performed on the simulated packet are recorded by adding additional tags indicating the operations performed. Further, if the simulated packet is dropped internally by an operation or has reached an egress interface and is ready to be transmitted, the tags are removed from the simulated packet and ordered for analysis. Upon removal, the tags are analyzed and the actions taken on the simulated packet are determined. However, although the simulated packet is an efficient way of determining operations taken on a packet in certain situations, it does not have the advantages provided by using one or more captured packets in other situations.

The present claimed subject matter focuses on utilizing one or more captured packets (e.g., captured Internet Protocol packets) to determine operations performed on packets by a network device (e.g., a router). In one embodiment, IP packets are captured and forwarded through the network device. Operations performed on the captured IP packets are logged. Different from using a simulated packet approach wherein a user inputs key attributes of the simulated packet, the captured packet approach, in one example, automatically includes key attributes such as flags, Differentiated Services Code Point (DSCP) bits, and other Layer 5 (session layer) and Layer 4 (transport layer) header information.

Also, different from using a single simulated packet at a time, using captured packets means multiple packets can be sent at a time through a network device. As multiple data packets are used in both directions to establish a Transmission Control Protocol (TCP)/Internet Protocol (IP) session and pass data, captured packets may be easily adapted to establish and analyze TCP/IP sessions. Moreover, many TCP/IP related problems may be debugged correctly if the stream of data packets is in order. In general, the simulated packets approach is unable to correctly debug TCP/IP issues. For example, with regards to diagnosing problems associated with the voice protocol context, TCP handshake context, FTP context, and/or HTTP web traffic context, multiple packets may be used for an effective evaluation.

In addition, a significant portion of Layer 7 (application layer) information is often used for troubleshooting various protocols. For instance, information included in the control channel payload is of great importance to troubleshooting File Transfer Protocol (FTP). In general, captured packets include Layer 7 information and can be efficiently utilized in troubleshooting different protocols.

Furthermore, by utilizing a captured packets approach a client can capture the actual network traffic and save it in a "pcap" or "tcpdump" format. Subsequently, the client can replay the network traffic to analyze what in fact has occurred.

Additionally, the captured packets approach can be used to compare devices. Although the simulated packet approach can also be utilized to evaluate the behavior of network devices, it may not provide the complexity of real network traffic. By taking the captured packets approach, a highly complicated network traffic pattern can be sent through a first device and the corresponding first output saved. Subsequently, the complicated traffic pattern can be sent through a second device and a corresponding second output saved. By comparing the first output to the second output, the behavior of the first device can be compared with the behavior of the second device. Thus, the captured data packet approach can be utilized as an efficient diagnostic tool.

FIG. 1 illustrates a system 100 for utilizing captured packets to determine the operations performed on packets by a network device, in accordance with an embodiment of the present claimed subject matter. System 100 includes computing device 102, ingress interface 104, network device 106, egress interface 108, captured packet 110, captured packet 114, captured packet 118, tag 112, tag 116, and tag 120. In one embodiment, computing device 102 is a command line interface station where a user can perform post processing of captured packets.

Also, although system 100 is shown and described as having certain numbers and types of elements, the present claimed subject matter is not so limited; that is, system 100 can include elements other than those shown, and can include more than one of the elements that are shown. For example, system 100 can include a greater or fewer number of captured packets than the three captured packets (captured packets 110, 114, and 118) shown. Also, system 100 can include a greater number of tags in each of the captured packets. In one embodiment, captured packet 110 has other tags (not shown) in addition to tag 112. Also, in one embodiment, the captured packets include key attributes such as flags, Differentiated Services Code Point (DSCP) bits, Layer 5 header information, and Layer 4 header information.

In one embodiment, captured packets 110, 114, and 118 are sent through network device 106 and are utilized to trace the operations and actions taken on a packet as it passes through a network device. In one example, the captured packets 110, 114, and 118 are packets that were captured at an earlier point in time at the ingress interface. The captured packets 110, 114, and 118 are inputted into network device 106 via ingress interface 104 of network device 106. Network device 106 can be a firewall, a switch, a router, an Intrusion Prevention System (IPS), other types of network security devices, and/or other compatible devices.

Captured packets 110, 114, and 118 travels through the same processing paths of network device 106 as if it were packets of normal network traffic. However, in contrast to packets of normal network traffic, if operations are performed on the captured packets 110, 114, and 118, tags, such as tags 112, 116, and 120, are added to the captured packets 110, 114, and 118 to indicate the operation. In one example, multiple tags are added to each of the captured packets 110, 114, and 118 to record different operations performed on the captured packets. Similarly, the path (e.g., data path) taken by captured packets 110, 114, and 118 are indicated by additional tags.

Upon reaching either an egress interface, e.g., egress interface 108, of the network device 106 or being dropped internally by an operation, a captured packet (e.g., captured packet 114) is removed from its path. In one example, the tags, such as tag 116, are removed, ordered for processing, and analyzed to determine the actions and operations taken on the dropped packet (e.g., captured packet 114). In another example, the tags, such as tag 116, are saved with the captured packet (e.g., captured packet 114). In one embodiment, upon removal of the captured packet 114 from the data plane, actions taken on the captured packet 114 is presented to a user with the corresponding line in the configuration information that represents the given action. An action/operation taken on the captured packet 114 can be an ingress access filter operation, a route lookup operation, a network address translation (NAT) operation, an authentication and/or authorization operation, an advanced protocol filter operation, a quality of service operation, an encryption and/or decryption operation, a tunneling operation, an egress access filter, an egress interface, and/or a final action to transmit or drop operation.

Figure 2:
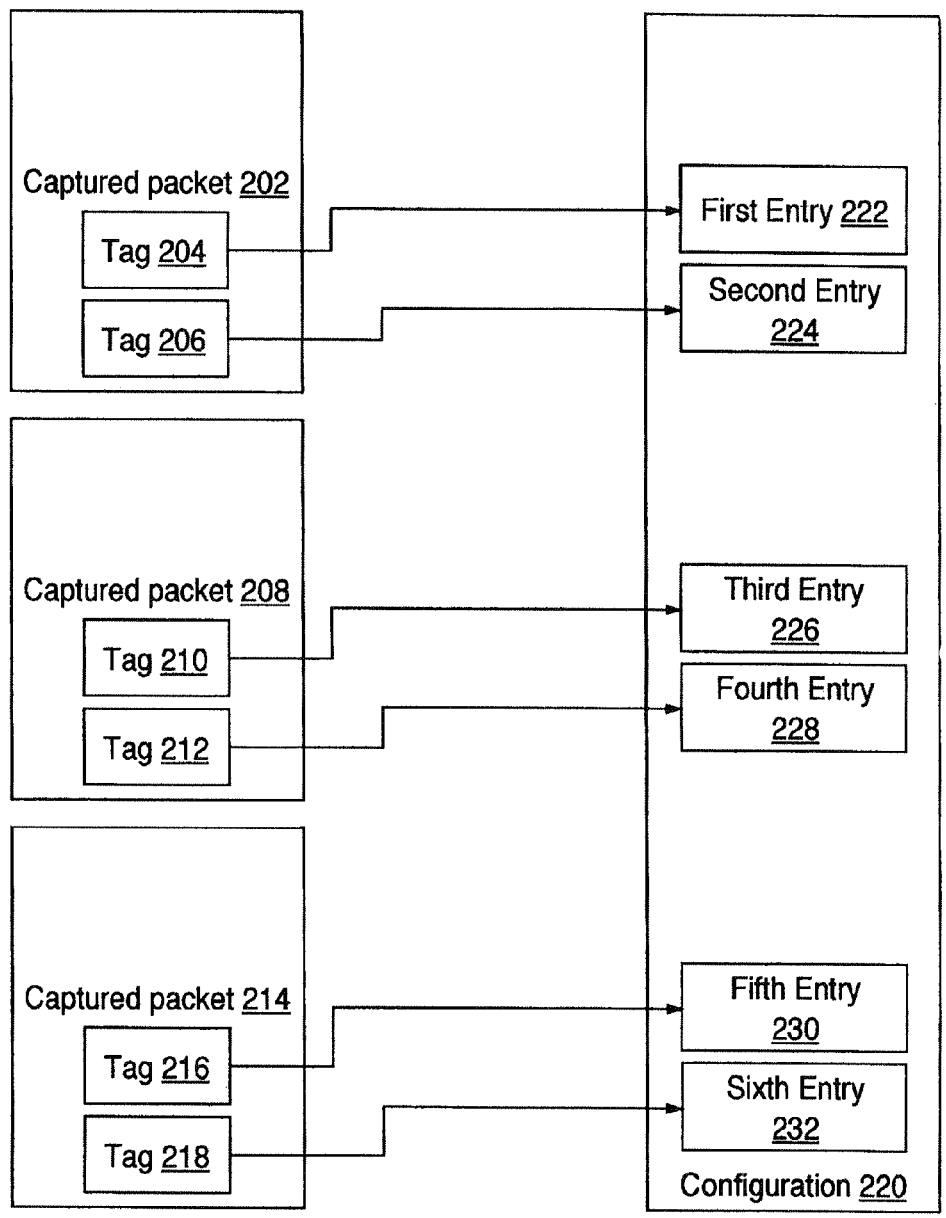
FIG. 2 illustrates an example embodiment of a block diagram of tags associated with captured packets.

FIG. 2 illustrates a block diagram of captured packets 202, 208, and 214 being analyzed, in accordance with an embodiment of the present claimed subject matter. Captured packet 202 includes tags 204 and 206. Captured packet 208 includes tags 210 and 212. Captured packet 214 includes tag 216 and 218. Also, configuration information 220 includes first entry 222, second entry 224, third entry 226, fourth entry 228, fifth entry 230, and sixth entry 232.

Also, although captured packets 202, 208, 214, and configuration information 220 are shown and described as having certain numbers and types of elements, the present claimed subject matter is not so limited; that is, captured packets 202, 208, 214, and configuration information 220 can include elements other than those shown, and can include more than one of the elements that are shown. In one example, captured packet 202 can include a greater or fewer number of tags than the two tags (tags 204 and 206) shown. In another example, configuration information 220 can include a greater or fewer number of entries than the six entries (first entry 222, second entry 224, third entry 226, fourth entry 228, fifth entry 230, and sixth entry 232) shown.

Once a captured packet, such as captured packet 202, is removed from its path, the associated tags, such as tags 204 and 206, in one embodiment, are saved with the captured packet (e.g., captured packet 202) and analyzed to determine the operations performed on the captured packet (e.g., captured packet 202). In one example, substantially all actions performed on the captured packet 202 are recorded. The actions correlated directly to specific lines in the configuration information. Thus, a user can see the actions taken on captured packet 202 by a network device. Also, a user is informed which part of the configuration information should be modified to change an action.

In the present embodiment, tag 204 and tag 206 indicate the operations performed on the captured packets 202 and are removed. Upon removal, the operations indicated by tags 204 and 206 are correlated with its corresponding entries, e.g., first entry 222 and second entry 224, in the configuration information.

Specifically, the operation indicated in tag 204 is correlated to first entry 222 of configuration information 220 and the operation indicated in tag 206 is correlated to second entry 224 of configuration information 220. Once the process of correlation is complete, the results may be displayed to a user. Although in the present embodiment a tag corresponds to one operation, the present claimed subject matter is not so limited. In other embodiments, a tag may indicate several separate operations performed on a captured packet (e.g., captured packet 202).

Similarly, tags 210 and 212 of captured packet 208 are correlated to third entry 226 and fourth entry 228 respectively. In the same way, tags 216 and 218 are correlated to fifth entry 230 and sixth entry 232. In one example, a captured packet, such as captured packet 208, can have more than two associated tags. Also, one or more tags may be correlated to the same entry of configuration information 220.

By automatically correlating operations to its associated entries in the configuration information, a user can easily match actions taken on captured packets (e.g., captured packets 202, 208, and 214) to the corresponding configuration. Thus, the present claimed subject matter allows a more time effective way for debugging, troubleshooting, or verification of configuration rules.

Figure 3:
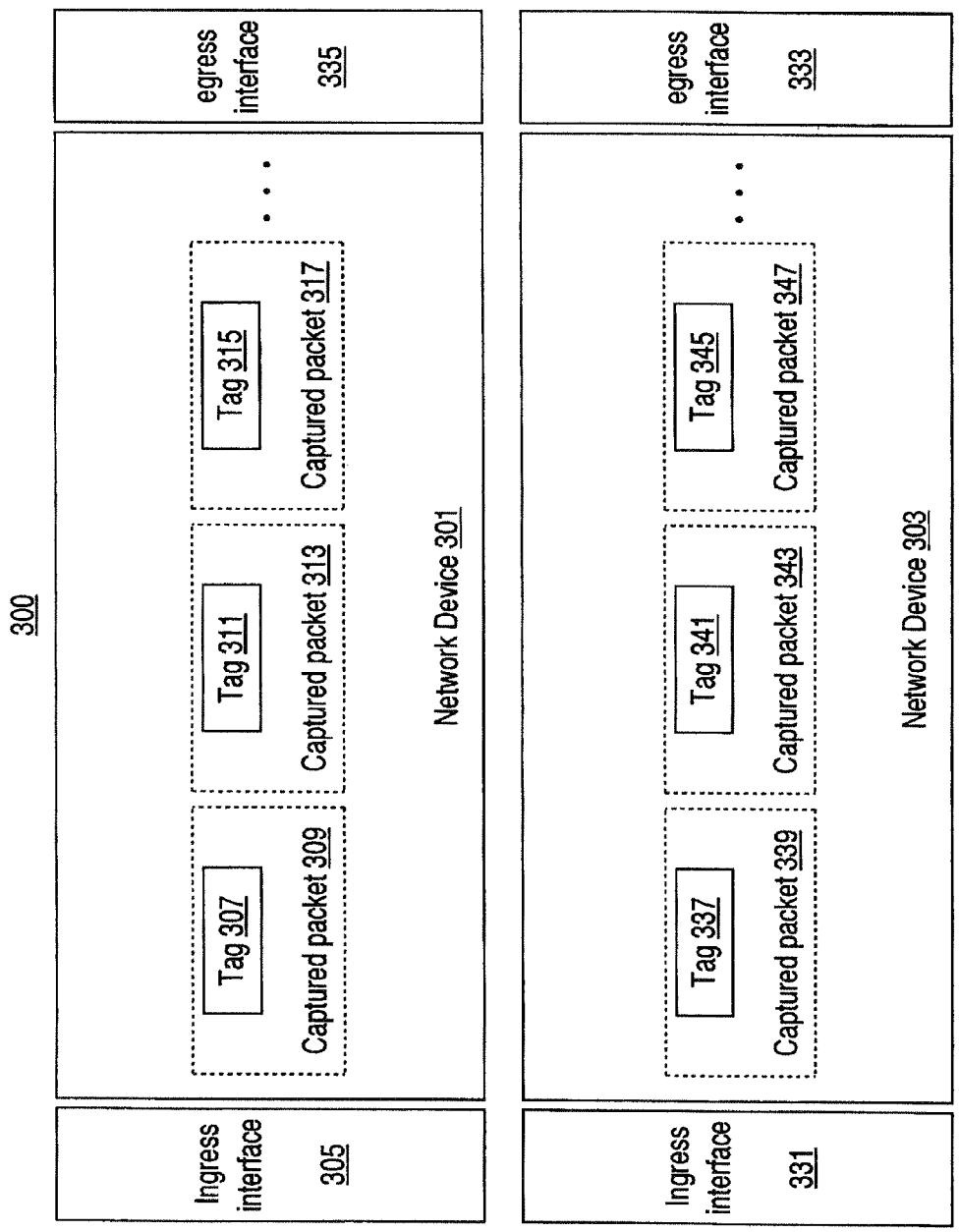
FIG. 3 illustrates an example embodiment of a system for utilizing captured packets to compare network devices.

FIG. 3 illustrates a system 300 of utilizing captured packets to compare network devices. System 300 includes network device 301 and network device 303. Network device 301 includes ingress interface 305 and egress interface 335. Network device 303 includes ingress interface 331 and egress interface 333.

In the present embodiment, a network traffic pattern (e.g., captured packet 309 with tag 307, captured packet 313 with tag 311, and captured packet 317 with tag 315) is sent through network device 301. Also, captured packet 339 with tag 337, captured packet 343 with tag 341, and captured packet 347 with tag 345, represents the same network traffic pattern and is sent through network device 303. Although network traffic pattern is shown and described, in one example, as including captured packets 309, 313, and 317, the claimed subject matter is not so limited. In another embodiment, the network traffic pattern is more complex.

A corresponding first output from the network device 301 is saved. Also, a corresponding second output from the network device 303 is saved. The first output is compared with the second output to contrast the behavior of network device 301 with network device 303. Accordingly, captured packets (e.g., captured Internet Protocol packets) may be utilized as an efficient diagnostic tool.

Figure 4:
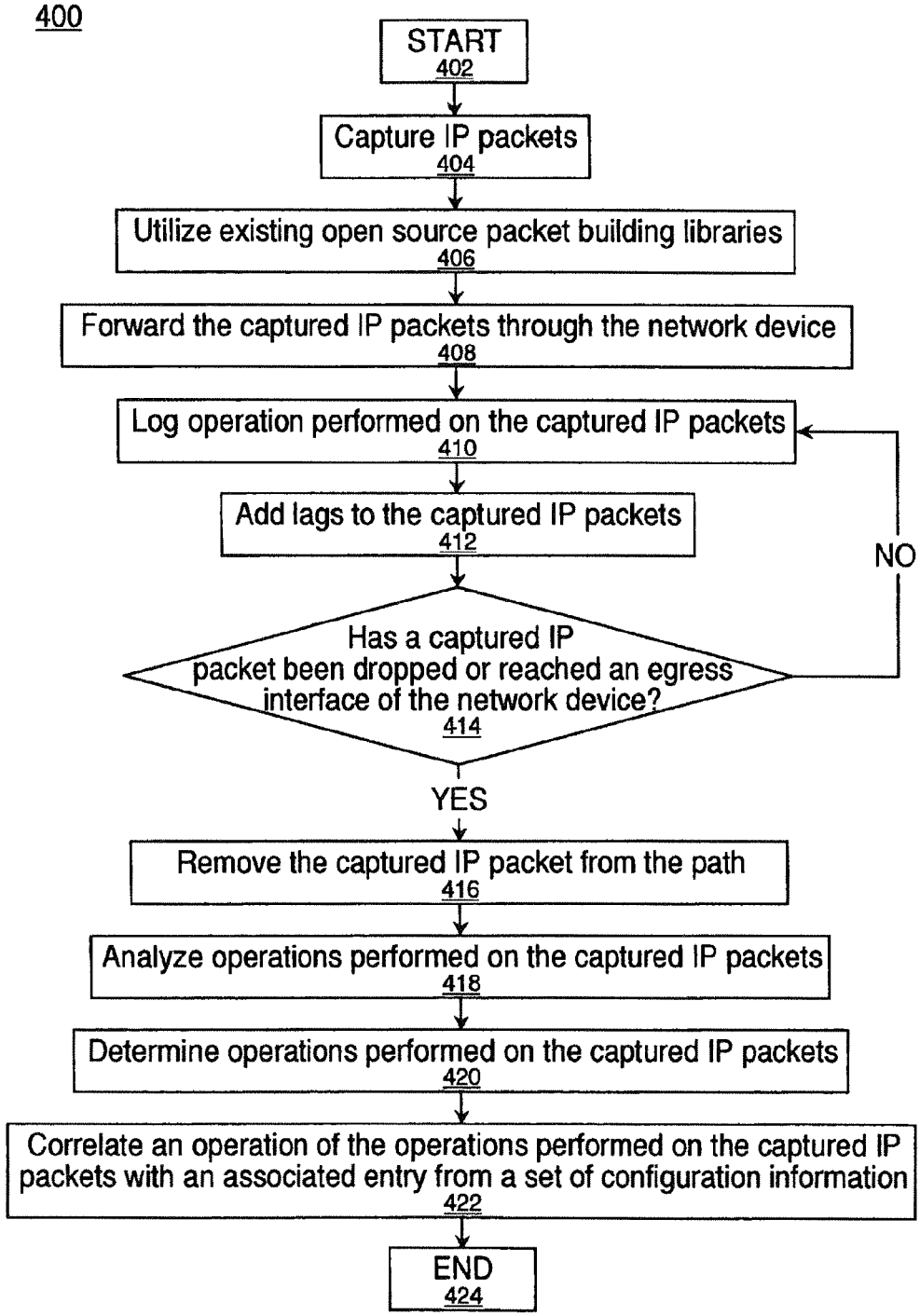
FIG. 4 illustrates an example embodiment of a process for utilizing captured packets.

FIG. 4 illustrates a flowchart 400 of a method for utilizing captured packets to determine the operations performed on packets by a network device upon which embodiments in accordance with the present claimed subject matter can be implemented. Although specific steps are disclosed in flowchart 400, such steps are exemplary. That is, embodiments of the present claimed subject matter are well suited to performing various other or additional steps or variations of the steps recited in flowchart 400. It is appreciated that the steps in flowchart 400 can be performed in an order different than presented.

At block 402, the process starts. At block 404, IP packets are captured. In one embodiment, the captured IP packets form a complex network traffic pattern suitable for diagnosing the behavior pattern of a network device.

At block 406, existing open source packet building libraries are utilized. In one embodiment, the open source packet building libraries run on hosts connected to the network device (e.g., a firewall).

At block 408, the captured IP packets forming a network traffic pattern are forwarded through the network device (e.g., a router). In one embodiment, the captured IP packets are injected into the ingress interface of the network device. Also, a network device can be a firewall, a router, an Intrusion Prevention System (IPS), a network security device, and/or other compatible network devices.

At block 410, operations performed on the captured IP packets are logged as the captured IP packets featuring the network traffic pattern pass through a network device. At block 412, tags are added to the captured IP packets. In one embodiment, an operation performed on the captured IP packets is logged by adding a tag indicating the operation onto the captured IP packet. In one embodiment, a plurality of tags is added to a captured IP packet to indicate a corresponding plurality of operations performed. In one embodiment, a tag indicates a plurality of operations taken on the captured IP packet. Also, in one embodiment, the path (e.g., data path) taken by the captured IP packet is traced. In one embodiment, the path taken by the captured IP packet is traced by adding tags indicating the path taken by the captured IP packet.

At block 414, it is determined whether a captured IP packet has been dropped or has reached an egress interface of the network device. Determining whether a captured IP packet has been dropped or has reached an egress interface of the network device can be implemented in a variety of ways. In one embodiment, a processor determines whether a captured IP packet has been dropped or has reached an egress interface of the network device. If it is determined that a captured IP packet has not been dropped or has not reached an egress interface of the network device, then operations performed on the captured IP packet continues to be logged.

At block 416, if the captured IP packet has been dropped internally or has reached an egress interface of the network device, then the captured IP packet is removed from the data path. In one embodiment, removal is implemented by deleting the captured IP packet. In another embodiment, removal is implemented by directing the captured IP packet away from its prior path. Also, removal can be immediate or time-delayed.

At block 418, operations performed on the captured IP packets are analyzed. In one embodiment, the tags from the captured IP packet are removed in order, and analyzed to determine the actions taken on the captured IP packet. In one embodiment; a user uses a command line interface (CLI) to perform post processing of the tags.

At block 420, the operations performed on the captured IP packets are determined. At block 422, an operation of the operations performed on the captured IP packets is correlated with an associated entry from a set of configuration information. In one embodiment, each tag is automatically correlated with its associated entry from the configuration information. In one embodiment, operations performed on the IP packets and associated configuration information is displayed to a user. At block 424, the process ends.

Accordingly, embodiments offer effective methods for a user to trace actions performed on packets without having to manually fabricate a packet. By utilizing captured packets and a light weight trace technique, the performance of the network device is negligibly impacted. Moreover, embodiments allow tagging of a time line of the life of packets in various modules, which allow a real time profile of network traffic through network devices. Consequently, embodiments can be utilized to debug modules that take a long time in processing packets.

Figure 5:
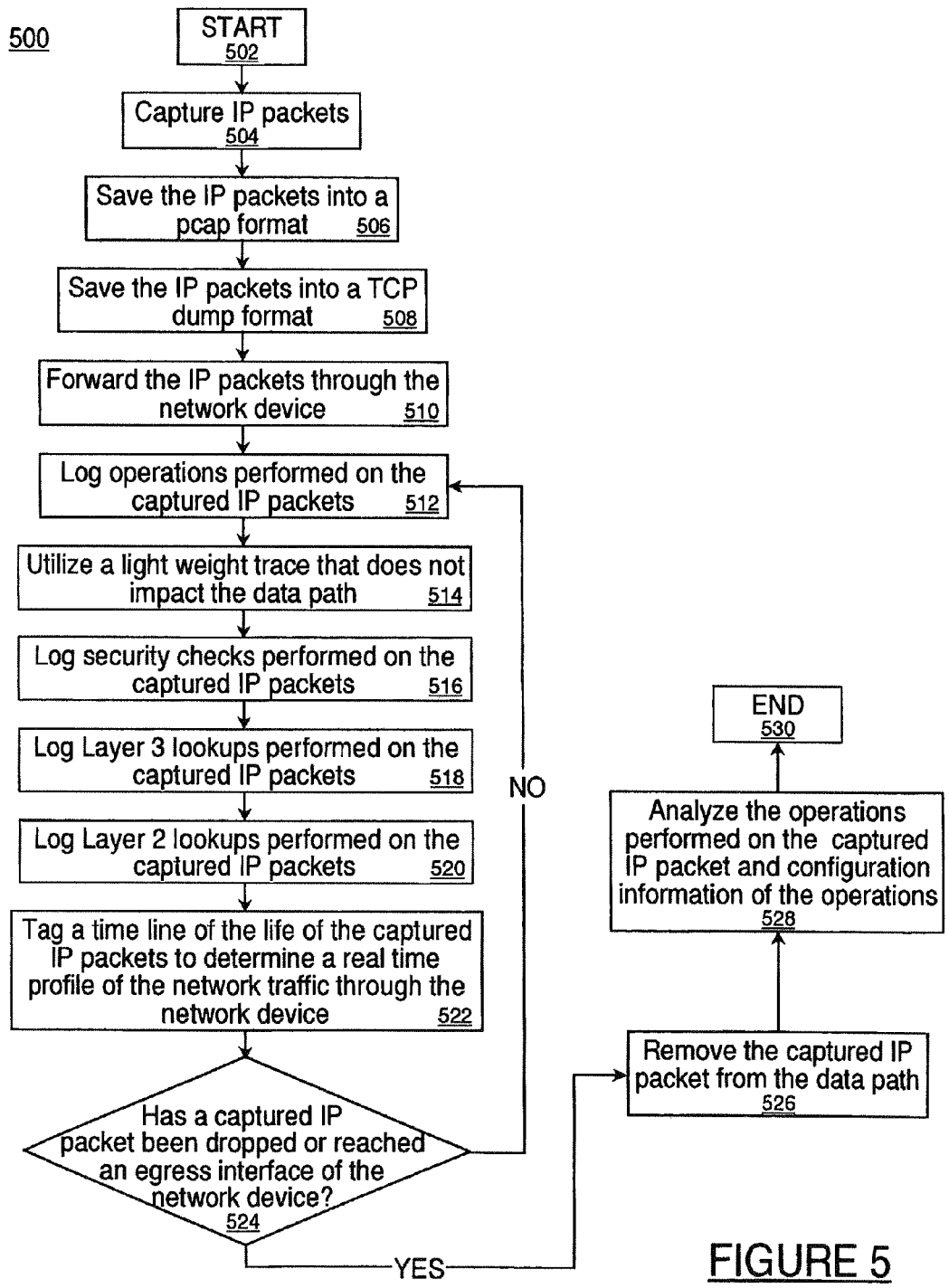
FIG. 5 illustrates an example embodiment of a process for applying a light weight trace on captured packets.

FIG. 5 illustrates a flowchart 500 of a method for applying a light weight trace on captured packets to determine the operations performed on packets by a network device (e.g., a switch) upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented.

At block 502, the process starts. At block 504, IP packets are captured. In one embodiment, the captured IP packets includes key attributes such as flags, Differentiated Services Code Point (DSCP) bits, and other Layer 5 (session layer) and Layer 4 (transport layer) header information.

At block 506, the IP packets are saved in a pcap (packet capture) format. At block 508, the captured IP packets are saved in a TCP dump format. In one embodiment, the IP packets are saved onto a non-volatile memory, such as Read-Only Memory (ROM), flash memory, hard disks, floppy disks, magnetic tapes, optical disk drives, and Magnetic Random Access Memory (MRAM). In another embodiment, the captured packets are saved onto a volatile memory, such as Random Access Memory (RAM), Dynamic Random Access Memory (DRAM), Static Random Access Memory (SRAM), Content Addressable Memory, dual-ported RAM, and/or other types volatile memory.

At block 510, the captured IP packets are forwarded through the network device. In one embodiment, the captured IP packets are injected into the ingress interface of the network device. Also, a network device can be a firewall, a router, an Intrusion Prevention System (IPS), a network security device, and/or other compatible network devices.

At block 512, operations performed on the captured IP packets are logged. In one embodiment, one or more tags are added to each of the captured IP packets to trace actions taken and/or operations performed on the captured IP packets. In one embodiment, each tag on the captured IP packet is subsequently correlated to an entry in configuration information.

At block 514, a light weight trace is utilized. In one embodiment, the light weight trace does not impact the data path and does not appreciably impact the performance of the network device. Hence, unlike conventional packet tracers, embodiments allow a user to analyze a network device without negatively impacting the proper functioning of the network device.

At block 516, security checks performed on the IP packets are logged. In one embodiment, every security check performed on a captured UP packet is recorded. At block 518, Layer 3 (transport layer) lookups on the captured IP packets are performed. At block 520, Layer 2 (data link layer) lookups on the captured IP packets are performed.

At block 522, a time line of the life of the captured IP packet is tagged to determine a real time profile of the network traffic through the network device. In one embodiment, time lines of the life of packets in various modules are tagged, which allow a real time profile of network traffic through network devices. Accordingly, embodiments can be utilized to debug modules that take a long time in processing packets.

At block 524, it is determined whether a captured IP packet has been dropped or has reached an egress interface of the network device (e.g., a firewall).

At block 526, if the captured IP packet has been dropped internally or has reached an egress interface of the network device, then the captured IP packet is removed from the data path. In one embodiment, the removal is immediate. In another embodiment, the removal is time-delayed.

At block 528, operations performed on the captured IP packets are analyzed. In one embodiment, analysis of the operations performed on the captured IP packets takes place at a command line interface (CLI) station. In one embodiment, the analysis includes post processing of the trace buffer. In one embodiment, an operation of the operations performed on the captured IP packets is correlated with an associated entry from a set of configuration information. In one embodiment, each tag is automatically correlated with its associated entry from the configuration information. In one embodiment, operations performed on the IP packets and associated configuration information is displayed to a user. At block 530, the process ends. Accordingly, the presently disclosed technology may be used for debugging, troubleshooting, or verification of configuration rules.

Figure 6:
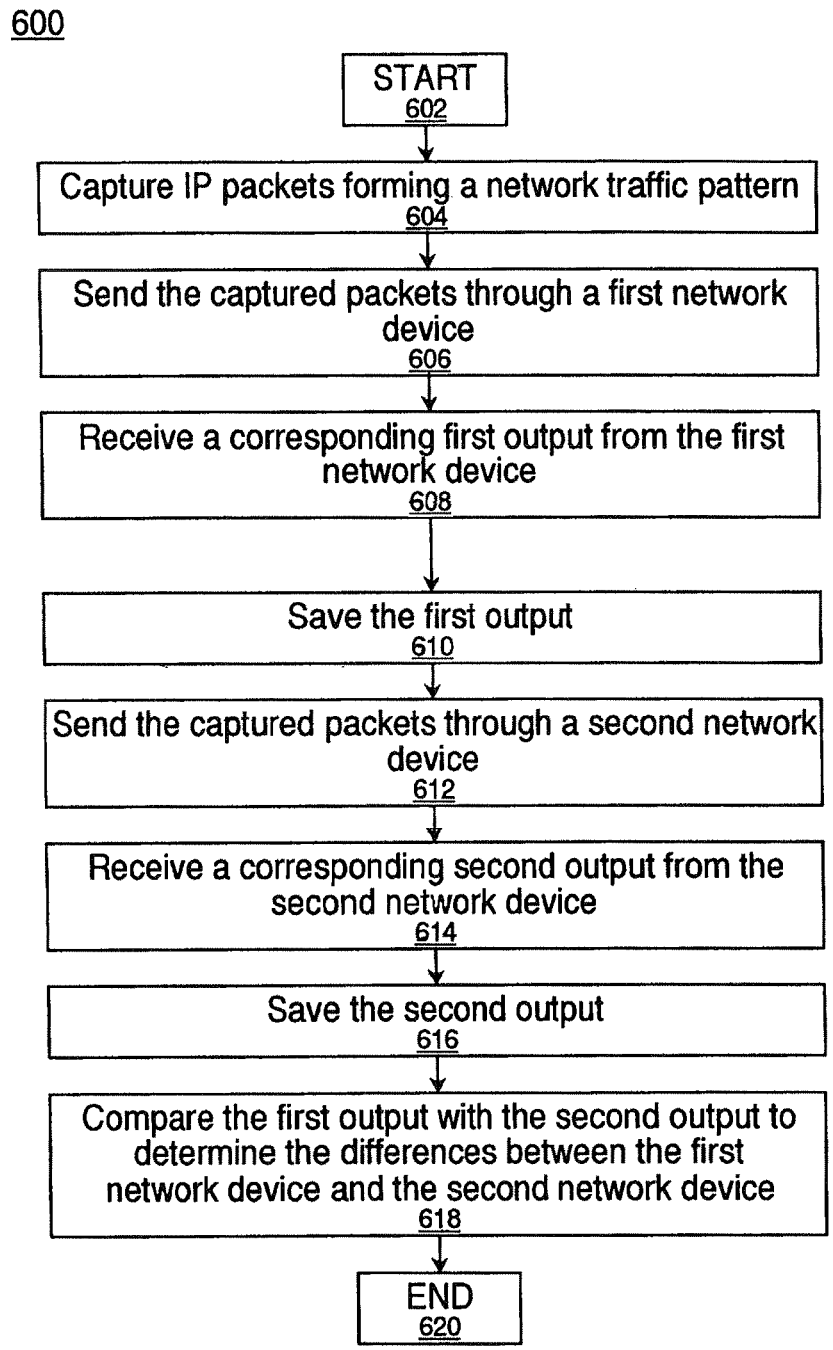
FIG. 6 illustrates an example embodiment of a process for utilizing captured packets to compare the behavior pattern of network devices.

FIG. 6 illustrates a flowchart 600 of a method for utilizing captured packets to compare the behavior pattern of network devices upon which embodiments in accordance with the present claimed subject matter can be implemented. Although specific steps are disclosed in flowchart 600, such steps are exemplary. That is, embodiments of the present claimed subject matter are well suited to performing various other or additional steps or variations of the steps recited in flowchart 600. It is appreciated that the steps in flowchart 600 can be performed in an order different than presented.

At block 602, the process starts. At block 604, IP packets forming a network traffic pattern are captured. In one embodiment, the network traffic pattern is highly complex. With the simulated packet approach, it may be inefficient for a user to manually define a network traffic pattern of equal complexity. Thus, the captured IP packets approach allow a more effective means for obtaining a complex network traffic pattern.

At block, 606, the captured packets are sent through a first network device. The network device can be a router, a firewall, and/or an Intrusion Prevention Device. At block 608, a corresponding first output from the first network device is received. At block 610, the first output is saved.

At block 612, the captured packets are sent through a second network device. At block 614, a corresponding second output is received from the second network device. At block 616, the second output is saved. Although in the present embodiment the captured packets are sent through a first network device and a second network device, the claimed subject matter is not so limited. The captured packets can be sent through any number of network devices in order to compare the behavior patterns of network devices.

At block 618, the first output is compared with the second output to determine the differences between the first network device and the second network device. At block 620, the process ends. Accordingly, embodiments allow a complicated network traffic pattern to be sent through different devices in order to compare the behavior patterns between the different devices.

Figure 7:
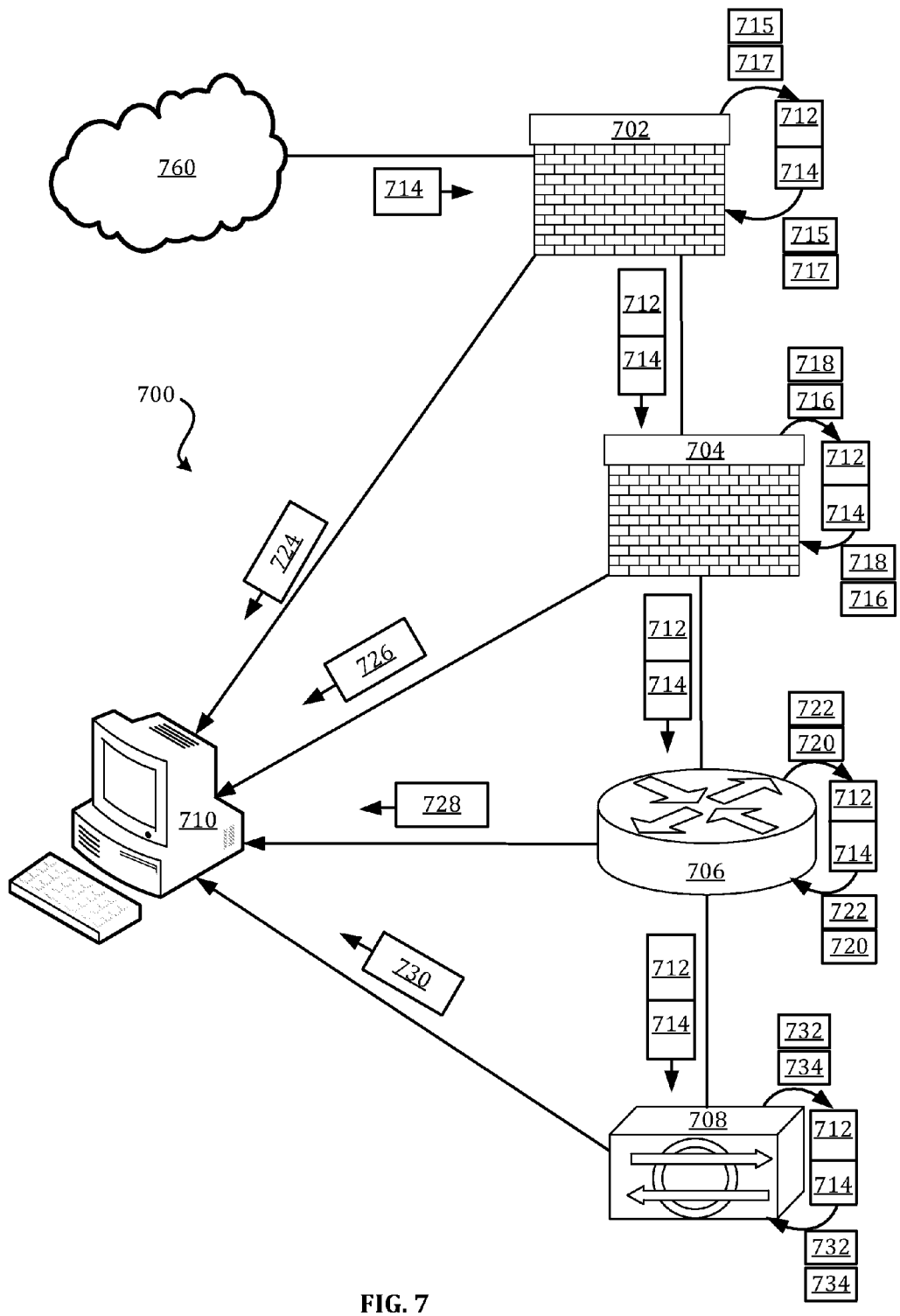
FIG. 7 illustrates an example embodiment of a system for tracing operations in one or more network devices.

FIG. 7 depicts a system 700 for tracing operations in one or more network devices (e.g., firewall 702, firewall 704, router 706 and/or Intrusion Prevention System (IPS) 708). In an example embodiment, firewall 702 may be configured to select one or more packets for tracing based on packet filtering criteria. A packet flow may be identified by any of a variety of methods known to those of skill in the art, such as, using one or more access control lists (ACLS) and/or filters to define a set of packets in a flow. Claimed subject matter is not limited in this regard. Packets matched/classified to a flow may be further filtered according to packet selection criteria to select individual packets for tracing. Packets in a flow may be selected based on whether a particular packet is a first packet in a flow, or a specific packet number in the flow, or is one of every n packets in the flow, whether a particular field is set in the packet (e.g., a reset (RST) flag set in a TCP header) and/or packet type, or the like, or any combinations thereof.

In an example embodiment, a packet 714 may originate at a client in network 760 and may be received by firewall 702. Packet 714 may be a single packet, a first packet of a flow of packets, or a subsequent packet of the flow of packets. Based on a determination that packet 714 matches packet filtering criteria, firewall 702 may capture packet 714, select packet 714 for tracing, and/or add trace option identifier 712 to packet 714.

In an example embodiment, trace option identifier 712 may be set in an IP header of packet 714, as an IP option, and/or may be set in a TCP header of packet 714 as a TCP option. Trace option identifier 712 may be set in other ways and claimed subject matter is not limited in this regard. Trace option identifier 712 may be configured to trigger firewall 702 to trace operations and/or actions taken on packet 714 by firewall 702. When packet 714 egresses firewall 702, trace option identifier 712 may remain in packet 714. Other network devices in a path of packet 714 may be triggered by trace option identifier 712 to trace operations and/or actions on packet 714 as well.

In one example embodiment, firewall 702 may record actions taken on packet 714 responsive to trace option identifier 712 by tagging packet 714. As packet 714 is processed by firewall 702, firewall 702 may add one or more tags (e.g., tags 715 and 717) to packet 714 to identify one or more operations performed by firewall 702 on packet 714. In an example embodiment, responsive to trace option identifier 712, firewall 704 may generate a report 724 identifying operations performed on packet 714. Report 724 may be based on tags 715 and 717. Firewall 702 may correlate tags 715 and/or 717 to configuration information corresponding to operations associated with each of tags 715 and/or 717. The configuration information may be specific lines of text in configuration data associated with firewall 702. In an example embodiment, firewall 702 may compile the correlated configuration information into report 724.

Responsive to trace option identifier 712, firewall 702 may export report 724. Firewall 702 may belong to a domain corresponding to network management station 710 and may be locally configured to send report 724 to network management station 710. Network management personnel may access report 724 from network management station 710 to determine operations performed on packet 714 and/or for troubleshooting or other network management purposes. Tag 715 and/or tag 717 may be removed from packet 714 prior to packet 714 exiting an egress interface of firewall 702. Alternatively, tag 715 and/or tag 717 may be removed from packet 714 in the event packet 714 is dropped by firewall 702.

In an example embodiment, packet 714 may proceed to firewall 704. Responsive to trace option identifier 712, firewall 704 may initiate a packet tracing function including a packet tagging operation. As packet 714 is processed by firewall 704, firewall 704 may add tags to packet 714 to identify operations performed by firewall 704 on packet 714. For example, a tag 716 may be added to packet 714 if firewall 704 performs an operation, such as, determining if the packet is permitted by checking an appropriate ACL. Firewall 704 may perform additional or other operations, for example, firewall 704 may run a security check on packet 714 to determine if its sequence number falls within the TCP window/sequence space and may add tag 718 to packet 714 to identify the security check operation.

In an example embodiment, responsive to trace option identifier 712, firewall 704 may generate a report 726 identifying operations performed on packet 714. Report 726 may be based on tags 716 and 718. Firewall 704 may correlate tags 716 and/or 718 to configuration information corresponding to operations associated with each of tags 716 and/or 718. The configuration information may be a specific line or lines of text in the configuration data associated with firewall 704.

In an example embodiment, firewall 704 may compile the correlated configuration information into report 726. Report 726 may include additional information corresponding to the packet 714, such as, a source, a destination, ingress and egress ports, or the like, or combinations thereof. Report 726 may be an XML document and/or may be generated in any other appropriate format known to those of skill in the art and claimed subject matter is not limited in this regard.

In an example embodiment, responsive to trace option identifier 712, firewall 704 may export report 726. Firewall 704 may belong to a domain corresponding to network management station 710 and may be locally configured to send report 726 to network management station 710. Report 726 may be combined with report 724 to provide a log of operations performed on packet 714 across both firewall 702 and firewall 704. Network management personnel may access report 726 or a combination report including data from report 726 and 724. Tag 716 and/or tag 718 may be removed from packet 714 prior to packet 714 exiting an egress interface of firewall 704. Alternatively, tag 716 and/or tag 718 may be removed from packet 714 in the event packet 714 is dropped by firewall 704.

In an example embodiment, packet 714 may proceed to router 706. Responsive to trace option identifier 712, router 706 may trace various operations taken on packet 714. For example, router 706 may inspect packet 714 to determine if Network Address Translation (NAT) is to be executed on packet 714 and may add tag 720 to packet 714 to identify that such an operation was performed on packet 714. Router 706 may forward packet 714 to a particular output interface and add tag 722 to identify the forwarding operation.

In an example embodiment, responsive to trace option identifier 712, router 706 may generate a report 728 identifying operations performed on packet 714 by router 706. Report 728 may be based on tags 720 and/or 722. Router 706 may correlate tags 720 and/or 722 to configuration information corresponding to operations associated with each of tags 720 and/or 722. The configuration information may be specific lines in the configuration data associated with router 706.

In an example embodiment, router 706 may compile the correlated configuration information into report 728. Report 728 may include additional information corresponding to the packet 714. Responsive to trace option identifier 712, router 706 may export report 728. Router 706 may belong to a domain corresponding to network management station 710 and may be locally configured to send report 728 to network management station 710. Report 728 may be combined with reports 724 and/or 726 to provide a log of operations performed on packet 714 across firewall 702, firewall 704 and router 706. Tag 720 and/or tag 722 may be removed from packet 714 prior to packet 714 exiting router 706. Alternatively, tag 720 and/or tag 722 may be removed from packet 714 in the event packet 714 is dropped.

In an example embodiment, packet 714 may proceed to IPS 708. Responsive to trace option identifier 712, IPS 708 may trace various operations taken on packet 714. For example, IPS 708 may perform a protocol analysis on packet 714 for verification and may add tag 732 to packet 714 to identify that such an analysis was performed. IPS 708 may perform a deep packet inspection (DPI) operation on packet 714 to detect unusual packet characteristics and may add tag 734 to indicate that the DPI operation was performed on packet 714.

In an example embodiment, responsive to trace option identifier 712, IPS 708 may generate a report 730 identifying operations performed on packet 714 by IPS 708. Report 730 may be based on tags 732 and/or 734. IPS 708 may correlate tags 732 and/or 734 to configuration information corresponding to operations associated with each of tags 732 and/or 734. The configuration information may be specific lines in the configuration data associated with IPS 708.

In an example embodiment, IPS 708 may compile the correlated configuration information into report 730. Report 730 may include additional information corresponding to the packet 714. Responsive to trace option identifier 712, IPS 708 may send report 730 to network management station 710. Report 730 may be combined with reports 728, 726 and/or 724 to provide a log of operations performed on packet 714 across firewall 702, firewall 704, router 706 and IPS 708. Tag 732 and/or tag 734 may be removed from packet 714 prior to packet 714 exiting IPS 708. Tag 732 and/or tag 734 may be removed from packet 714 in the event packet 714 is dropped.

Figure 8:
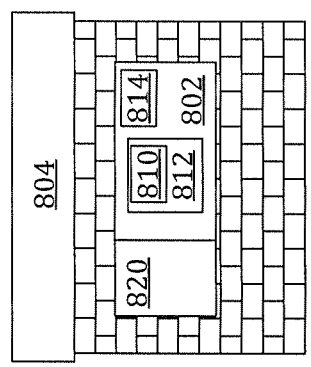
FIG. 8 illustrates an example embodiment of a network device and packet comprising a trace notice and trace level indicator.

FIG. 8 depicts an example of a firewall 804 and a packet 802 comprising a trace option identifier 812 and a trace level indicator 810. Trace level indicator 810 may identify a level of granularity to which operations on packet 802 are to be identified within a network device (e.g., firewall 804). Trace level indicator 810 may be associated with trace option identifier 812 and may identify a desired level of trace detail, such as, a low level of detail, a moderate level of detail and/or a high level of detail. Other levels of trace detail may be identified, for example, by category of operations and/or actions such as packet modification, security action, routing actions and/or a forwarding decision, or the like, or any combination thereof. In an example embodiment, one or more categories of operations and/or actions may be included and/or excluded from tracing. Trace level indicator 810 may identify different levels of trace detail depending on certain variables such as, device type or administrative domain, or the like, or any combination thereof.

In an example embodiment, trace level indicator 810 may indicate that packet 802 is to be traced at a low level of detail. Tracing at a low level of detail may comprise tagging and/or recording operations and/or actions if the actions taken on packet 802 result in a modification of packet 802. For example, firewall 804 may add a tag 814 to packet 802 when firewall 804 executes a Network Address Translation (NAT) process resulting in a change to an Internet Protocol (IP) address in a header 820 of packet 802. Tag 814 may correspond to the NAT operation. However, another operation such as packet inspection and/or a queuing operation may not warrant adding a tag where a low level of trace detail is identified in trace level indicator 810. There are a wide variety of other and/or additional operations and/or actions that may be traced for packet 802 and claimed subject matter is not limited in this regard.

Figure 9:
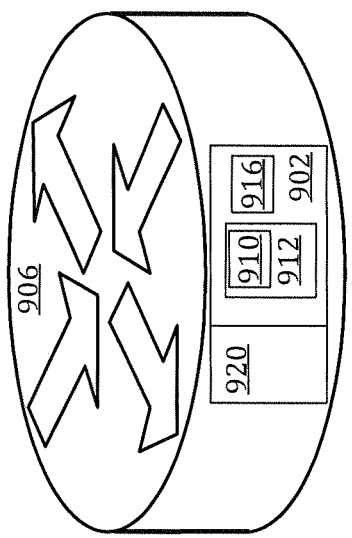
FIG. 9 illustrates another example embodiment of a network device and packet comprising a trace notice and trace level indicator.

FIG. 9 depicts an example of a router 906 and a packet 902 comprising a trace option identifier 912 and a trace level indicator 910. Trace level indicator 910 may indicate that a moderate level of trace detail is selected for packet 902. Trace level indicator 910 may be associated with trace option identifier 912. A moderate level of trace detail may include recording certain actions taken in association with packet 902 that result in modification of packet 902 as well as actions categorized as security actions, and/or routing actions. Operations and/or actions taken by router 906 may be identified by tagging packet 902. For example, at a moderate level of trace detail, router 906 may add a tag 916 to packet 902 when router 906 executes a NAT operation, a route look-up, packet inspection, a queuing operation and/or determines a next hop address. However, where trace level indicator 910 requests a moderate level of trace detail another operation such as selecting a particular egress interface for packet 906 may not warrant recording and/or adding a tag to packet 902. There are a wide variety of other and/or additional operations and/or actions that may be traced in association with packet 902 and claimed subject matter is not limited in this regard.

Figure 10:
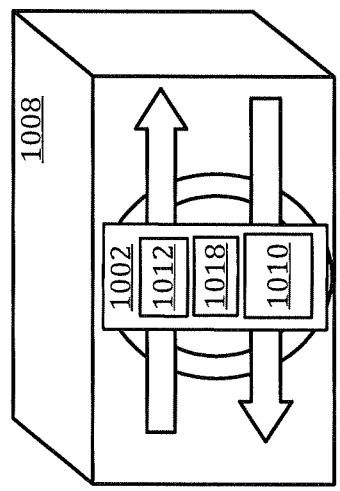
FIG. 10 illustrates yet another example embodiment of a network device and packet comprising a trace notice and trace level indicator.

FIG. 10 depicts an example of an IPS 1008 and a packet 1002 comprising a trace option identifier 1012 and a trace level indicator 1010. Trace level indicator 1010 may be separate from trace option indicator 1012. Trace level indicator 1010 may indicate that a high level of trace detail is requested for packet 1002. A high level of trace detail may include tracing and/or recording substantially all operations and/or actions taken on packet 1002 by tagging packet 1002. For example, at a high level of trace detail, IPS 1008 may add a tag 1018 to packet 1002 when IPS 1008 executes a deep packet inspection operation, a route look-up, a protocol compliance operation, a queuing operation, selects a particular egress interface and/or determines a next hop address. There are a wide variety of other and/or additional operations and/or actions that may be traced for packet 1002 and claimed subject matter is not limited in this regard.

Figure 11:
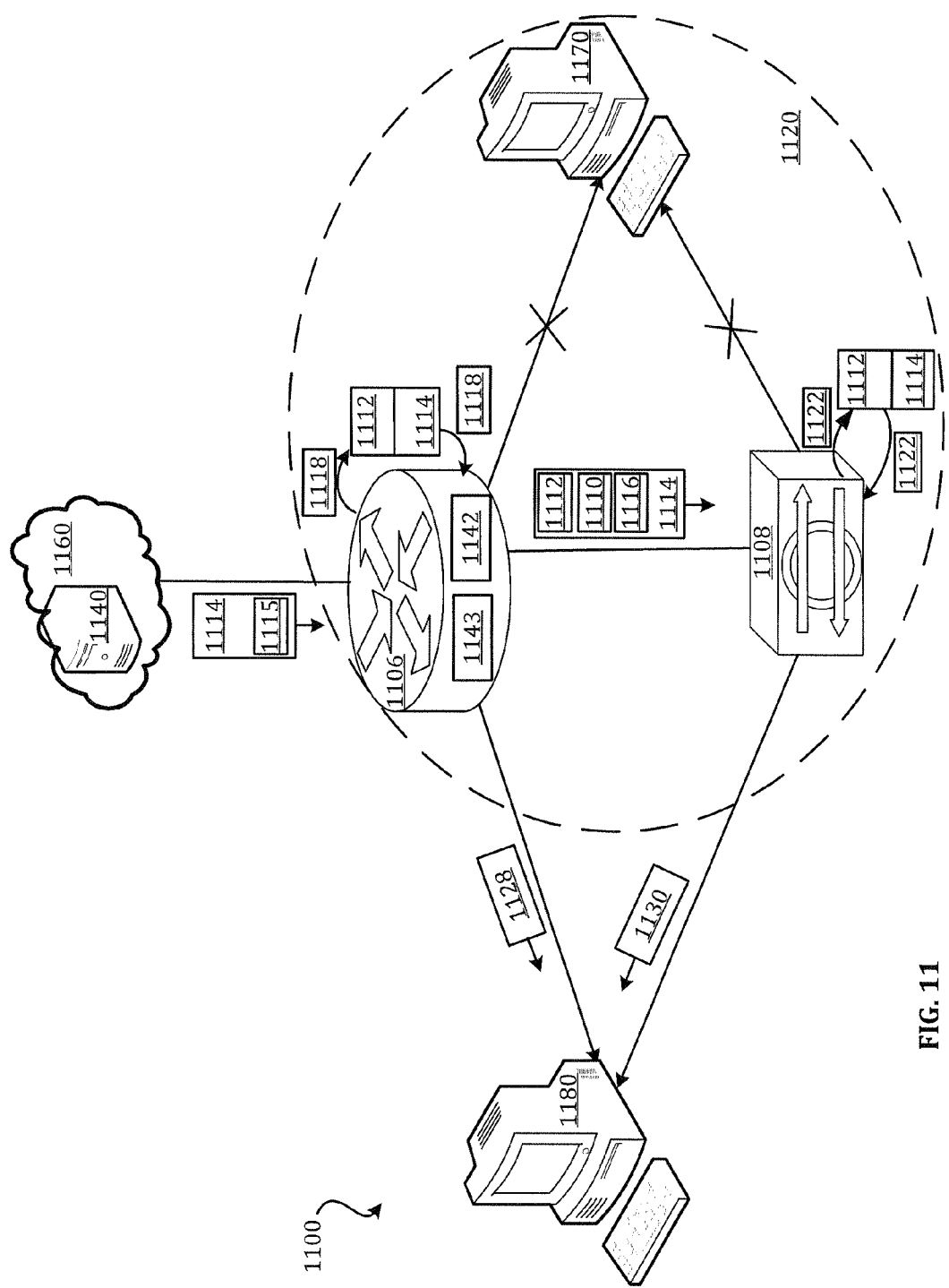
FIG. 11 illustrates another example embodiment of a system for tracing operations in one or more network devices.

FIG. 11 depicts an example of a system 1100 for selecting a packet 1114 for tracing. System 1100 may include a network management station 1180, a network management station 1170, a router 1106 and an IPS 1108. In an example embodiment, router 1106 and/or IPS 1108 may belong to a domain 1120 corresponding to network management station 1170. Network management station 1180 may not be in domain 1120. Router 1106 may receive and capture packet 1114 from any of a variety of network devices, such as server 1140 in network 1160.

In an example embodiment, router 1106 may capture and filter packet 1114 to determine that packet 1114 is a candidate for tracing router 1106 operations and/or actions. Classification component 1142 and/or ACL 1143 may be configured to select one or more packets for end-to-end tracing based on any of a variety of criteria. For example, classification component 1142 may be a filter configured to identify a packet flow associated with packet 1114 based on various filter criteria such as source and/or destination addresses and/or source and/or destination ports. When a packet flow is identified, ACL 1143 may be configured to select packet 1114 from the identified flow for tracing based on packet order and/or data in a specific field of packet 1114. In an example embodiment, packet selection criteria may be pre-set by a user and/or may be default selection criteria. Selection criteria may be saved within a configuration of router 1106. Data that may be used by ACL 1143 for selecting packet 1114 may be found in a packet header 1115 (e.g., an IP header, a TCP header and/or a User Datagram Protocol (UDP) header or any other header, or a combination thereof), and/or any other field in packet 1114. There are a wide variety of other and/or additional ways that packets may be classified and selected for tracing and claimed subject matter is not limited in this regard.

In an example embodiment, responsive to selecting packet 1114 for tracing, router 1106 may set a trace option in packet 1114 by adding trace option identifier 1112 to a field of packet 1114. Router 1106 may be configured to add a trace level indicator 1110 to packet 1114 to identify a level of detail to which to trace packet 1114. Router 1106 may be configured to respond to trace option identifier 1112. Router 1106 may tag packet 1114 with tag 1118 to record an operation performed on packet 1114 by router 1106 that corresponds to the trace level identified by trace level indicator 1112. Router 1106 may correlate tag 1118 to a specific line in the configuration information corresponding to the operation or action associated with tag 1118 and may generate a report 1128 based on tag 1118.

In an example embodiment, router 1106 may belong to domain 1120 managed by NMS 1170 and may typically send activity reports to NMS 1170. However, router 1106 may add NMS identifier 1116 to packet 1114 to identify NMS 1180 to which to send trace report 1128 thus overriding configuration data for router 1106 indicating that reports are to be sent to NMS 1170. NMS identifier 1116 may include an IP address or other identifier to identify NMS 1180. Thus, router 1106 may send report 1128 to NMS 1180 rather than NMS 1170.

In an example embodiment, once a trace option identifier 1112 is set in packet 1114, trace option identifier 1112 may remain in packet 1114 even as packet 1114 is routed through other network devices. Trace level indicator 1110 and/or NMS identifier 1116 may also remain with packet 1114 as it is routed to other network devices. For example, trace option identifier 1112 may remain with packet 1114 as packet 1114 is routed to IPS 1108. IPS 1108 may respond to trace option identifier 1112 by tracing actions performed on packet 1114 by IPS 1108, at a level identified in trace level indicator 1110. IPS 1108 may add tag 1122 to trace an action taken by IPS 1108 on packet 1114. Subsequent to tracing, IPS 1108 may remove tag 1122 and generate report 1130 including packet trace detail at a level indicated by trace level indicator 1110. IPS 1108 may send report 1130 to network management station 1180 as indicated by NMS identifier 1116.

Figure 12:
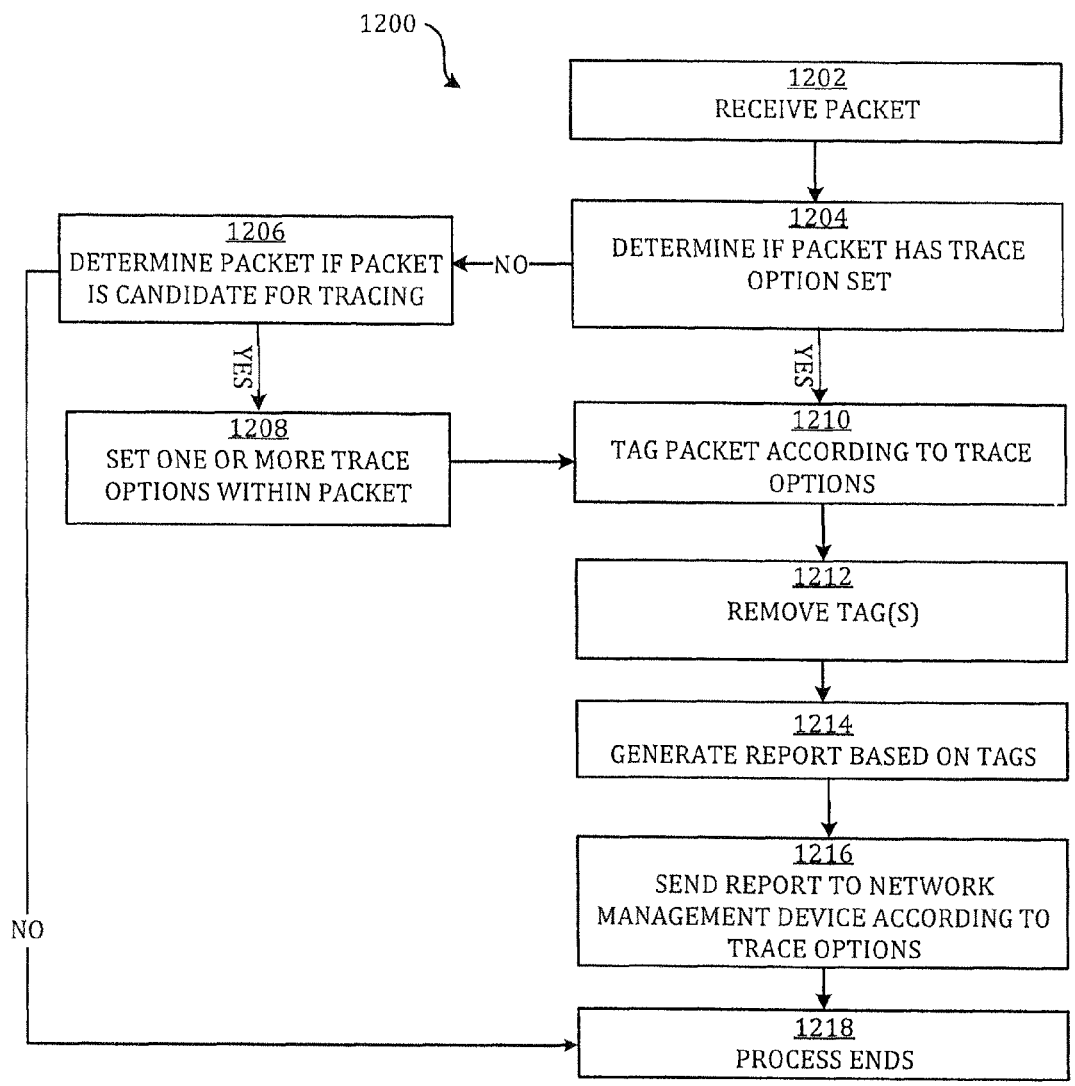
FIG. 12 illustrates an example embodiment of a process for tracing operations on a packet.

FIG. 12 depicts a process 1200 for tracing operations on a packet. At operation 1202 a network device may receive and capture a packet. At operation 1204, the network device may determine if the packet has a trace option set. In an example embodiment, the network device may inspect a particular field or fields of the packet to determine if the trace option is set. If a trace option is set, process 1200 may flow to operation 1210 where the network device may tag the packet based on the trace option(s). If there is no trace option set, process 1200 may proceed to operation 1206 where the network device may determine if the packet is a candidate for packet tracing. Such a determination may be based on any of a variety of factors, such as packet type, whether the packet is the first or a subsequent packet in a particular flow, source and destination of the packet, ingress/egress ports, or the like or any combinations thereof.

If the packet is not a candidate for tracing process 1200 flows to operation 1218 where process 1200 ends. If it is determined that the packet is a candidate for tracing, process 1200 flows to operation 1208 where the network device may set one or more trace options within the packet. In an example embodiment, trace options may indicate that a network device is to tag the packet with tags identifying various operations and/or actions taken on the packet itself, or taken in association with the packet. A trace option may identify a level of granularity to which to trace operations and/or actions executed by the network device corresponding to the packet. A trace option may identify a network management device to which to send a report about the tracing results. Process 1200 may then flow to operation 1210 where the network device may tag the packet according to the trace option(s).

At operation 1212, the network device may remove the tags from the packet. At operation 1214, the network device may generate a report based on the tags and any relevant trace options, such as, a trace level indicator. Process 1200 may proceed to operation 1216 where the network device may send the report to a network management device for processing. In an example, the network management device may be specified in a trace option or may be a network management device for a domain to which the network management device belongs. At operation 1218, the process ends.

Many modifications and other embodiments of the disclosed technology will come to mind to those skilled in the art to which this disclosed technology pertains having the benefit of the teachings presented in the foregoing descriptions and the associated drawings. Therefore, it is to be understood that the disclosed technology is not to be limited to the specific embodiments disclosed and that modifications and other embodiments are intended to be included within the scope of the appended claims. Although specific terms are employed herein, there are used in a generic and descriptive sense only and not for purposes of limitation. It will be obvious to those having skill in the art that many changes may be made to the details of the above-described embodiments without departing from the underlying principles of the disclosed technology. The scope of the present disclosed technology should, therefore, be determined only by the following claims.

What is claimed is:

1. A method, comprising:
   capturing, by a processing device, a packet at an ingress port of the processing device;
   determining, by the processing device, whether the packet is a candidate for tracing;
   setting, by the processing device, a trace option identifier within the packet indicating that the packet is selected for tagging when operations are performed by on the packet by the processing device;
   when performing an operation on the packet, determining whether the packet includes the trace option identifier;
   in response to determining that the packet includes the trace option identifier, adding, by the processing device, corresponding a tag to the packet based on the trace option identifier to indicate the operation performed on the packet;

upon at least one of reaching an egress port of the processing device or being dropped by an operation of the processing device, removing the packet from a forwarding path; and generating, by the processing device, a report based on the tag that automatically correlates the tag with a corresponding entry in configuration information stored in the processing device;

wherein the captured packet includes DSCP bits.

2. The method of claim 1, further comprising adding, by the processing device, a network management device identifier to the packet.

3. The method of claim 2, further comprising sending, by the processing device, the report to a network management device identified by the network management identifier.

4. The method of claim 1, further comprising adding, by the processing device, a trace level identifier to the packet identifying one or more operations to trace.

5. The method of claim 4, wherein the trace level identifier identifies a category of operations to trace.

6. The method of claim 1, wherein the determining the packet is a candidate for tracing further comprises filtering, by the processing device, the packet based on a packet order within a flow of packets or data in a header of the packet, or a combination thereof.

7. The method of claim 1, wherein the generating the report based on the tag further comprises including, by the processing device, a line of text corresponding to the configuration information, wherein the line of text correlates to the operation.

8. The method of claim 1, further comprising:
performing additional operations on the packet; and
adding a corresponding tag to the packet after performance of each of the additional operations.

9. The method of claim 1, further comprising:
exporting, by the processing device, the packet with the trace option identifier.

10. An apparatus, comprising:
an ingress port;
an egress port;
a processor; and
a memory coupled to the processing device comprising instructions executable by the processor, the processor operable when executing the instructions to:
receive a packet at the ingress port;
when performing an operation on the packet, determine whether the packet includes a trace option identifier;
in response to determining that the packet includes the trace option identifier, add a corresponding tag to the packet based on the trace option identifier to indicate the operation performed on the packet;
upon at least one of reaching an egress port of the processing device or being dropped by an operation, remove the packet from a forwarding path; and
generate a report based on the tag that automatically correlates the tag with a corresponding entry in configuration information stored in the memory;
wherein the captured packet includes DSCP bits.

11. The apparatus of claim 10, wherein the processor is further operable to remove the tag and forward the packet to a subsequent network device including the trace option identifier.

12. The apparatus of claim 10, wherein the processor is further operable to:
identify a network management device based on a network management device identifier in the packet; and
send the report to the network management device.

13. The apparatus of claim 10, wherein the processor is further operable to identify the operation based on a trace level identifier included in the packet.

14. The apparatus of claim 13, wherein the trace level identifier identified a category of operations.

15. The apparatus of claim 10, further comprising removing the tag prior to generating the report.

16. The apparatus of claim 10, wherein the processor is configured to determine whether the packet is a candidate for tracing.

17. The apparatus of claim 16, wherein to determine whether the packet is a candidate for tracing, the processor is configured to filter the packet based on a packet order within a flow of packets or data in a header of the packet, or a combination thereof.

18. The apparatus of claim 10, wherein the processor is configured to capture the packet at the ingress port and set the trace option identifier within the packet to indicate that the packet is selected for tagging when operations are performed on the packet.

19. The apparatus of claim 10, wherein to receive the packet, the processor is configured to receive a packet that was captured by a different device that previously set the trace option identifier in the packet.

20. The apparatus of claim 10, wherein to generate the report based on the tag, the processor is configured to include a line of text corresponding to the configuration information, wherein the line of text correlates to the operation.

* * * * *

UNITED STATES PATENT AND TRADEMARK OFFICE
CERTIFICATE OF CORRECTION

| | |
|---|---|
| PATENT NO. | : 8,769,091 B2 |
| APPLICATION NO. | : 13/397213 |
| DATED | : July 1, 2014 |
| INVENTOR(S) | : White et al. |

Page 1 of 1

It is certified that error appears in the above-identified patent and that said Letters Patent is hereby corrected as shown below:

In the Claims

Claim 1, Column 15, line 1, please remove "a" after corresponding and place --a-- before corresponding.

Signed and Sealed this
Twenty-eighth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,769,091 B2 | Page 1 of 1 |
| APPLICATION NO. | : 13/397213 | |
| DATED | : July 1, 2014 | |
| INVENTOR(S) | : White, Jr. et al. | |

It is certified that error appears in the above-identified patent and that said Letters Patent is hereby corrected as shown below:

In the Claims

Claim 1, Column 15, line 1, please remove "a" after corresponding and place --a-- before corresponding.

This certificate supersedes the Certificate of Correction issued October 28, 2014.

Signed and Sealed this
Eighteenth Day of November, 2014

Michelle K. Lee
*Deputy Director of the United States Patent and Trademark Office*